US008611526B2

(12) United States Patent
Chen et al.

(10) Patent No.: US 8,611,526 B2
(45) Date of Patent: Dec. 17, 2013

(54) CTIEX, SYSTEM AND METHOD FOR CHANNEL ASSOCIATED DATA TRANSMISSION BETWEEN AGENT AND AUTOMATIC SERVICE

(75) Inventors: Xianbin Chen, Shenzhen (CN); Wenyuan Wang, Shenzhen (CN)

(73) Assignee: ZTE Corporation, Shenzhen (CN)

(*) Notice: Subject to any disclaimer, the term of this patent is extended or adjusted under 35 U.S.C. 154(b) by 0 days.

(21) Appl. No.: 13/257,963

(22) PCT Filed: Apr. 21, 2010

(86) PCT No.: PCT/CN2010/072012
§ 371 (c)(1),
(2), (4) Date: Feb. 20, 2012

(87) PCT Pub. No.: WO2011/020337
PCT Pub. Date: Feb. 24, 2011

(65) Prior Publication Data
US 2012/0134488 A1    May 31, 2012

(30) Foreign Application Priority Data

Aug. 21, 2009    (CN) .......................... 2009 1 0091378

(51) Int. Cl.
*H04M 3/00*    (2006.01)

(52) U.S. Cl.
USPC ............ 379/266.04; 379/265.01; 379/266.02; 379/221.12; 709/223

(58) Field of Classification Search
USPC ............... 379/266.04, 265.01, 26.02, 221.12; 709/223
See application file for complete search history.

(56) References Cited

U.S. PATENT DOCUMENTS

| 6,038,302 | A | 3/2000 | Burok et al. |
| 6,341,272 | B1* | 1/2002 | Randle .......................... 705/40 |
| 6,650,748 | B1* | 11/2003 | Edwards et al. ......... 379/266.04 |
| 7,123,711 | B1* | 10/2006 | Cope ........................ 379/221.14 |
| 7,693,972 | B2* | 4/2010 | Heller et al. ................... 709/223 |
| 2005/0147228 | A1* | 7/2005 | Perrella et al. ........... 379/265.06 |
| 2010/0087180 | A1* | 4/2010 | Wilson .......................... 455/418 |

FOREIGN PATENT DOCUMENTS

| CN | 101184128 A | 5/2008 |
| CN | 101193163 A | 6/2008 |
| CN | 101635774 A | 1/2010 |
| WO | 2008044036 A1 | 4/2008 |

OTHER PUBLICATIONS

International Search Report in international application No. PCT/CN2010/072012, mailed on Jul. 29, 2010.
English Translation of the Written Opinion of the International Search Authority in international application No. PCT/CN2010/072012, mailed on Jul. 29, 2010.

* cited by examiner

*Primary Examiner* — Joseph J Nguyen
(74) *Attorney, Agent, or Firm* — Oppedahl Patent Law Firm LLC

(57) ABSTRACT

The disclosure provides a CTIEX, system and method for implementing channel associated data transmission between an agent and an automatic service, wherein the CTIEX comprises a message module and a processing module; the message module receives a channel associated data request message transmitted by a cross-platform automatic service and transmits the channel associated data organized by the processing module to the cross-platform automatic service; the processing module is configured to analyze a call serial number in the channel associated data request message received by the message module to search out agent-associated information and organize channel associated data. The disclosure is capable of implementing channel associated data transmission between an agent and a cross-platform automatic service.

12 Claims, 3 Drawing Sheets

CTIEX, SYSTEM AND METHOD FOR CHANNEL ASSOCIATED DATA TRANSMISSION BETWEEN AGENT AND AUTOMATIC SERVICE

TECHNICAL FIELD

The disclosure relates to Next Generation Network (NGN) technology, particularly to a cross-platform message module/processing module (CTIEX, Computer Telecommunication Integration Exchanger), system and method for implementing channel associated data transmission between agent and automatic service.

BACKGROUND

Customer service system, also called call center, is an integrated information service system which is based on Computer Telecommunication Integration (CTI) technology, makes full use of several function integrations of communication network and computer network, and is associated with enterprise. Call center is capable of providing customer with several services such as call, fax, e-mail and the like, which is mainly responsible for processing demand, question, complaint, suggestion and inquiry proposed to the enterprise by the customer.

Current NGN-based Call Center (NGCC) is generally based on a single-call control platform. However, with the development of NGCC system, increase in call amount and market demand for high reliability, a multi-platform NGCC system has become a development tendency. In a single-platform NGCC system, after the customer connects to a manual agent communication, the call of current agent is controlled by a CTI device. It is usually needed to connect the customer to an automatic service during the communication between the agent and the customer so as to implement a voice or video service function performed by the automatic service, for instance, the process of broadcasting queried telephone numbers to the customer by the automatic service through speech, or the process of automatically broadcasting bill content of the customer by the automatic service, or the process of password collection to the customer by the automatic service, etc. During implementing these functions, the automatic service needs to know customer-related information and agent-associated information, and after completing the voice or video service from the automatic service, the automatic service also needs to inform the agent of service result. Therefore, channel associated data transmission between the agent and the automatic service is needed, in which the information is contained in form of channel associated data, so that the automatic service and the agent are capable of determining operation flow according to the content of received channel associated data. In single-platform NGCC system, the common flow of channel associated data transmission between an agent and an automatic service is as follows: during communication process between the agent and customer, when it is found that performing a voice or video service to the customer is needed, the agent will connect the customer to a designated automatic service through the control of the CTI. When connecting the customer to the automatic service, contents of information such as customer information, agent information, information of current call and the like will be contained in form of channel associated data to the automatic service. During performing the voice or video service to the customers, the automatic service will use the channel associated data, for instance, determining speech type to be broadcasted according to customer type in the channel associated data, and connecting to different databases to perform password authentication according to an agent-designated authentication password type, etc. After completing performing the voice or video service to the customer, the automatic service forwarding the customer back to communication with the agent and synchronously contains contents such as result of the voice or video service, service-related data and the like back to the agent in form of channel associated data via the CTI. After acquiring the channel associated data, the agent is capable of determining service result of the automatic service and service to be provided to the customer in a subsequent step, etc. As the single-platform NGCC system uses the same one platform, it is relatively easier to transmit the channel associated data between the agent and the automatic service, and both the agent and the automatic service can carried the channel associated data to each other during call forwarding. While in a multi-platform NGCC system, there is a case in which an agent of a platform connects a customer to an automatic service of another platform to perform a voice or video service. However, in the case of cross-platform channel associated data transmission between the agent and the automatic service, as call forwarding signaling interaction process needs to pass through a core network while the core network has a strict rule for signaling interaction, it is impossible to transmit a great amount of channel associated data during signaling interaction process of forwarding the customer to an automatic service of another platform by the agent. Moreover, after forwarding the customer to a cross-platform automatic service by the agent, when being connected with the customer, the automatic service cannot acquire the channel associated data of the agent due to the absence of related call information and agent number information of the original forwarding agent. Similarly, the service result must be transmitted back to the agent in form of channel associated data after the automatic service completes performing the voice or video service to the customer, however, due to the absence of related information of agent, the automatic service cannot transmit the channel associated data back to the agent, which results in a bottleneck during implementing the cross-platform channel associated data transmission between the agent and the automatic service.

FIG. 1 is a schematic diagram illustrating a process in which an agent forwards a customer to an automatic service to perform voice or video service and perform a channel associated data transmission with the automatic service in a single-platform NGCC system. As shown in FIG. 1, the content numbered 1 in the figure indicates, in communication between the agent and the customer, that the agent is required to forward the customer to automatic service so as to perform automatic service; the content numbered 2 indicates that the agent forwards the customer to the automatic service via CTI; the content numbered 3 indicates that the CTI brings the channel associated data of the agent to the automatic service; the content numbered 4 indicates that the automatic service performs speech broadcasting to the customer; the content numbered 5 indicates that after the service to the customers is completed, the automatic service informs the agent of service result in form of channel associated data via the CTI and forwards the customer back to communication with the agent; and the content numbered 6 indicates that the CTI transmits the channel associated data of the automatic service to the agent, and the agent resumes the communication with the customer and performs subsequent service for the customer according to the result in the channel associated data. In the case of cross-platform, as the forwarding between agent and automatic service needs to pass through a core network while the core network has a strict rule for signaling interaction, therefore the agent cannot transmit channel associated data to the automatic service during signaling interaction, thus influencing the subsequent operation.

SUMMARY

One object of the disclosure is to provide a cross-platform message module/processing module (CTIEX) for implementing channel associated data transmission between an agent and an automatic service, which is capable of implementing cross-platform channel associated data transmission between an agent and an automatic service.

Another object of the disclosure is to provide a system for implementing channel associated data transmission between an agent and an automatic service, which is capable of implementing cross-platform channel associated data transmission between an agent and an automatic service.

One further object of the disclosure is to provide a method for implementing channel associated data transmission between an agent and an automatic service, which is capable of implementing cross-platform channel associated data transmission between an agent and an automatic service.

In order to achieve above-mentioned object, the technical solution of the disclosure is as follows.

A CTIEX for implementing channel associated data transmission between an agent and an automatic service, comprises a message module and a processing module, wherein the message module is configured to receive a channel associated data request message transmitted by a cross-platform automatic service and transmit channel associated data organized by the processing module to the cross-platform automatic service; and the processing module is configured to analyze a call serial number in the channel associated data request message received by the message module to search out agent-associated information and organize channel associated data.

The message module is preferably configured to receive a request message sent from the agent for connecting to the cross-platform automatic service, and initiate a connection request massage to the cross-platform automatic service, wherein the connection request massage comprises the call serial number; and the processing module is preferably configured to analyze a current call serial number in the connection request message received by the message module.

The processing module is preferably configured to store, when analyzing the current call serial number in the connection request message received by the message module, the current call serial number and the channel associated data information in the current connection request transmitted by the agent.

The message module is configured to perform message receiving and message transmitting with the agent and the cross-platform automatic service through standard TCP.

The message module is preferably configured to receive service condition and service result content responded by the cross-platform automatic service through channel associated data message packet after the cross-platform automatic service completes automatic service to the customer according to the content of the channel associated data, and transmit channel associated data which is reorganized by the processing module and can be recognized by the agent to the agent; and the processing module is preferably configured to analyze the channel associated data message packet responded by the cross-platform automatic service to reorganize channel associated data which can be recognized by the agent.

A system for implementing channel associated data transmission between an agent and an automatic service, which comprises the CTIEX, and further comprising an agent and a cross-platform automatic service, wherein the agent is configured to transmit a request for connecting a customer to the cross-platform automatic service when the customer is needed to be connected to the cross-platform automatic service;

and the cross-platform automatic service is configured to analyze the current call serial number of the agent after receiving the connection request of the CTIEX, and then transmit a channel associated data request to the CTIEX; and perform a voice or video automatic service to the customer according to the content of the received channel associated data.

The channel associated data request of the cross-platform automatic service comprises: address information of the CTIEX and call serial number of the agent.

A method for implementing channel associated data transmission between an agent and an automatic service, comprises the following steps:

step A: a CTIEX receives a channel associated data request message transmitted by a cross-platform automatic service, analyzes call serial number in the channel associated data request message to search out agent-associated information, and organizes channel associated data, and then responds the channel associated data to the cross-platform automatic service; and step B: the cross-platform automatic service performs a voice or video automatic service to a customer according to the content of the received channel associated data.

Before the step A, the method further comprises the following steps:

step A1: the agent requests the CTIEX to connect the customer to the cross-platform automatic service;

step A2: the CTIEX initiates a connection request to the cross-platform automatic service to transmit current call serial number of the agent to the cross-platform automatic service; and step A3: after receiving the connection request of the CTIEX, the cross-platform automatic service analyzes the current call serial number of the agent, and then transmits a channel associated data request to the CTIEX.

In the step B, after the cross-platform automatic service performers the voice or video automatic service to the customer, further comprises the following steps:

the cross-platform automatic service transmits service condition and service result content to the CTIEX through a channel associated data message packet; and the CTIEX analyzes the channel associated data message packet of the cross-platform automatic service to reorganize channel associated data which can be recognized by the agent, and transmits the channel associated data to the agent through TCP.

The disclosure has the following advantageous effects: the CTIEX, system and method for implementing channel associated data transmission between an agent and an automatic service according to the disclosure are capable of transmitting agent information, customer information and other channel associated data information to a cross-platform automatic service conveniently when the agent connect the customer to the automatic service to perform an automatic service. The automatic service can perform a voice or video automatic service according to the received information, and transmit service result to the agent in form of channel associated data after the service is completed, wherein the channel associated data responded by the automatic service includes service result, service process information and the like. The manner of expanding CTI device into CTIEX device that configured to implementing the method, which adds interface to agent on the basis of original CTI, and expands interface to the automatic service with no need to add device or extra device cost.

DETAILED DESCRIPTION

A CTIEX, system and method for implementing channel associated data transmission between an agent and an automatic service in the disclosure will be described below in detail with reference to FIG. 2 to FIG. 4.

The CTIEX for implementing channel associated data transmission between an agent and a cross-platform automatic service in a NGCC system according to the disclosure will be described as follows.

Figure 1:
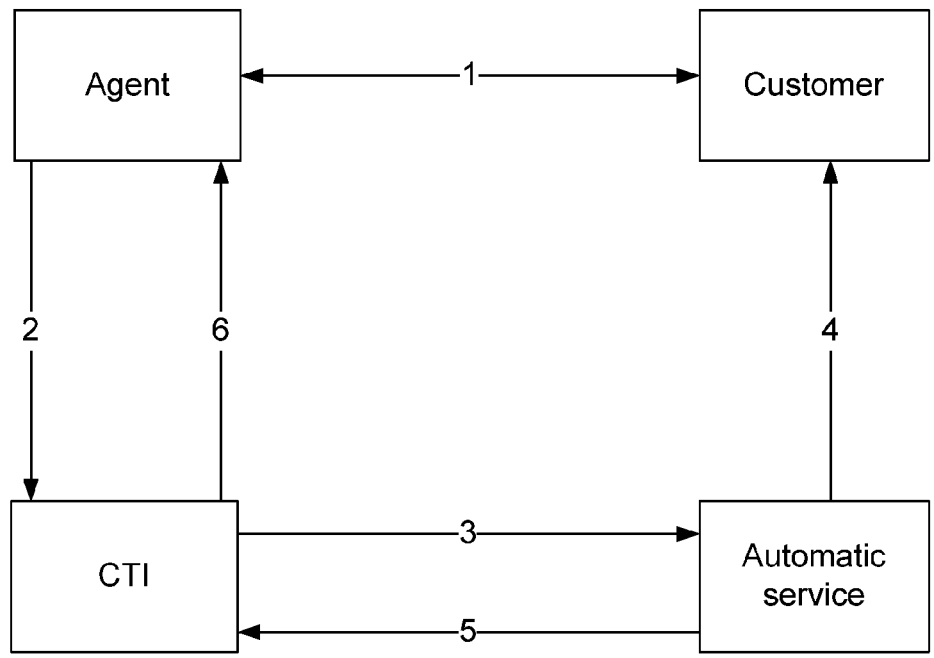
FIG. 1 is a schematic diagram illustrating channel associated data transmission between a single-platform agent and an automatic service in an existing NGCC system.
Figure 2:
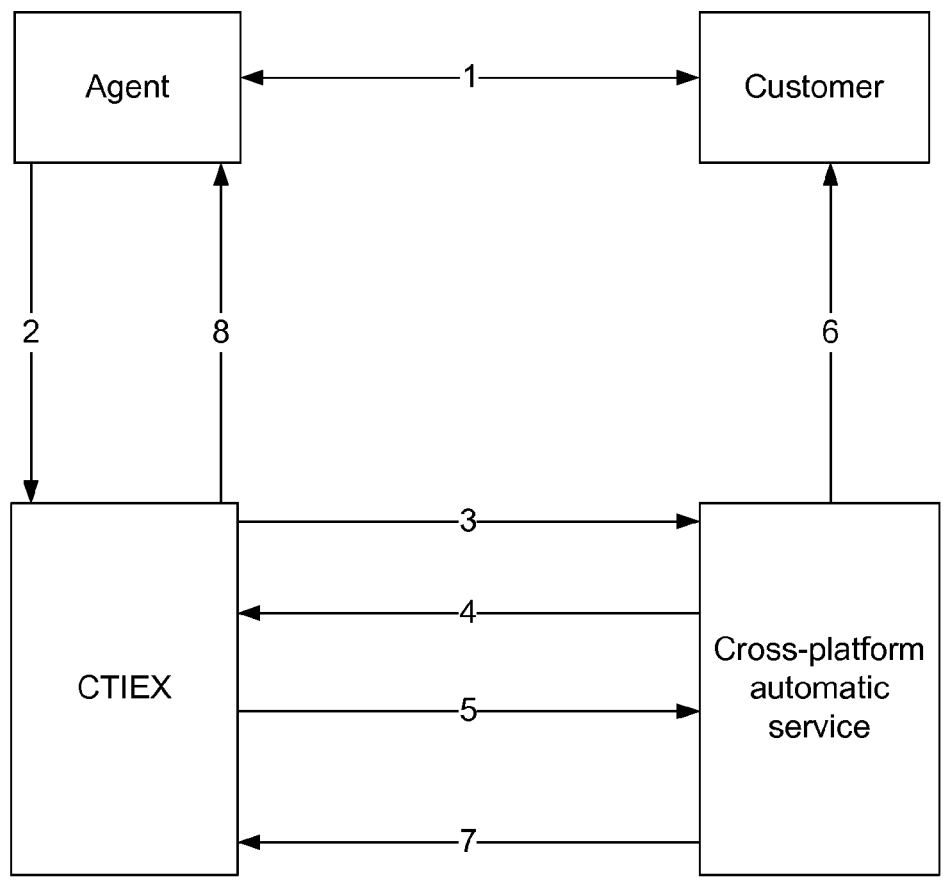
FIG. 2 is a structure diagram illustrating a system for implementing channel associated data transmission between an agent and a cross-platform service according to the disclosure.

As shown in FIG. 2, the CTIEX initiates a connection request to a cross-platform automatic service to forward a customer connected with an agent to the cross-platform automatic service, and during the forwarding process, transmits a current call serial number of the agent to the cross-platform automatic service; and receives a channel associated data request message transmitted by the cross-platform automatic service, analyzes a call serial number in the channel associated data request message to search out agent-associated information, and organizes the channel associated data to respond the channel associated data to the cross-platform automatic service.

wherein the CTIEX comprises a processing module, which is configured to, after receiving a request message from the agent for connecting to the cross-platform automatic service, store the call serial number in the request message which is corresponding to a current call of the agent, and store information of the channel associated data contained in the request from the agent.

Additionally, the processing module is preferably configured to, after the CTIEX receives the channel associated data request message sent from the cross-platform automatic service, analyze the channel associated data request message and search out agent-associated information according to the transmitted call serial number to organize the channel associated data.

The above-mentioned CTIEX processes data transmission through standard TCP with the agent and the cross-platform automatic service.

As shown in FIG. 2, a system for implementing channel associated data transmission in a NGCC system between an agent and a cross-platform automatic service in the disclosure comprises an agent, a CTIEX and a cross-platform automatic service, wherein the agent is configured to request the CTIEX to connect a customer to the cross-platform automatic service (as shown by the number 2) after the customer connects to the agent (as shown by the number 1), wherein there is a need to perform a voice or video automatic service to the customer during communication of a manual agent, and the automatic service is required to be connected to a specific cross-platform automatic service to be performed.

The CTIEX is configured to initiate a connection request to the automatic service to forward the customer to the cross-platform automatic service, and transmit the current call serial number of the agent to the automatic service through signaling during the forwarding process; the CTIEX is preferably configured to receive a channel associated data request message transmitted by the automatic service, analyze a call serial number in the channel associated data request message, search out agent-associated information to organize the channel associated data and respond the channel associated data to the automatic service.

The cross-platform automatic service is configured to, after receiving the connection request from the CTIEX, analyze the current call serial number of the agent, and then transmit a channel associated data request to the CTIEX and perform a voice or video automatic service to the customer according to the content of received channel associated data.

Specifically, the CTIEX in the disclosure is compatible with all functions of the CTI and has a new function of transmitting channel associated data between the agent and the cross-platform automatic service. The CTIEX has two new modules on the basis of the CTI: a cross-platform message module and a processing module.

wherein the cross-platform message module is configured to receive a cross-platform automatic service message and transmit a message, the object receiving or transmitting the message comprises the agent and the automatic service, and communicates with the agent and the automatic service through standard TCP.

Further, after the CTIEX receives the request from the agent for connecting the customer to the cross-platform automatic service, the processing module stores the call serial number corresponding to the current call of the agent in the request of the agent into a memory pool of the CTIEX, and the channel associated data information contained in the request by the agent is also stored, and then the CTIEX transmits the call serial number corresponding to the agent to the automatic service through signaling, as shown by number 3.

Further, after the automatic service receiving the connection request from the CTIEX, additional information is still needed to perform the automatic service to the customer, for instance, the identity information of the customer is needed when broadcasting the content of a bill to the customer, and a telephone number information is needed when broadcasting the content of the telephone number to the customer, therefore, the channel associated data request is needed to be transmitted to acquire the channel associated data of the agent from the CTIEX, wherein the channel associated data is needed by the automatic service to perform a service. The automatic service analyzes the call serial number of the agent, constructs a channel associated data request in which the address information of the CTIEX is contained and the call serial number of the agent is necessarily contained, and then put the call serial number into the request message and transmits the request message to the CTIEX to request the channel associated data of the agent from the CTIEX, as shown by number 4.

After receiving the request message, the cross-platform message module of the CTIEX forwards the message to the processing module; the processing module analyzes the request message from the automatic service, searches out agent-associated information according to the transmitted call serial number to organize channel associated data and put the channel associated data into a automatic service request result packet and forwards the request result packet to the message module; and the message module responds a result to the automatic service, as shown by number 5. After receiving the channel associated data, the automatic service performs a voice or video automatic service to the customer according to the content of the channel associated data, as shown by number 6.

In addition, the automatic service is preferably configured to, after performing the voice or video automatic service to the customer according to the content of the channel associated data, transmit contents such as service condition, service result and the like to the CTIEX in form of channel associated data, as shown by number 7; for instance, the automatic service may inform the agent of the broadcasting times and whether the customer is satisfied with the result of broadcasting when broadcasting number to the customer, and, when broadcasting bill information, the automatic service may also transmit summary of the bill to the agent so that the agent can make specific explanation to the customer, and, when performing password authentication to the customer, the automatic service may feed back to the customer whether the password authentication result is validated and whether the password level is advanced or common, etc.

The CTIEX is preferably configured to forward the message to the processing module, the processing module analyzes the channel associated data message packet of the automatic service to reorganize channel associated data which can be recognized by the agent and then transmits the channel associated data to the agent through TCP, as shown by number 8.

In addition, the CTIEX may configure address of the cross-platform automatic service and access code information of a service in advance by using a configuration file or in another way, so that the CTIEX is capable of transmitting the connection request to a designated automatic service during forwarding. After receiving the connection request of the CTIEX, the automatic service also stores address information of the CTIEX to facilitate subsequent interaction.

The above-mentioned expanded CTIEX device implements the channel associated data transmission between the agent and the cross-platform automatic service.

Figure 3:
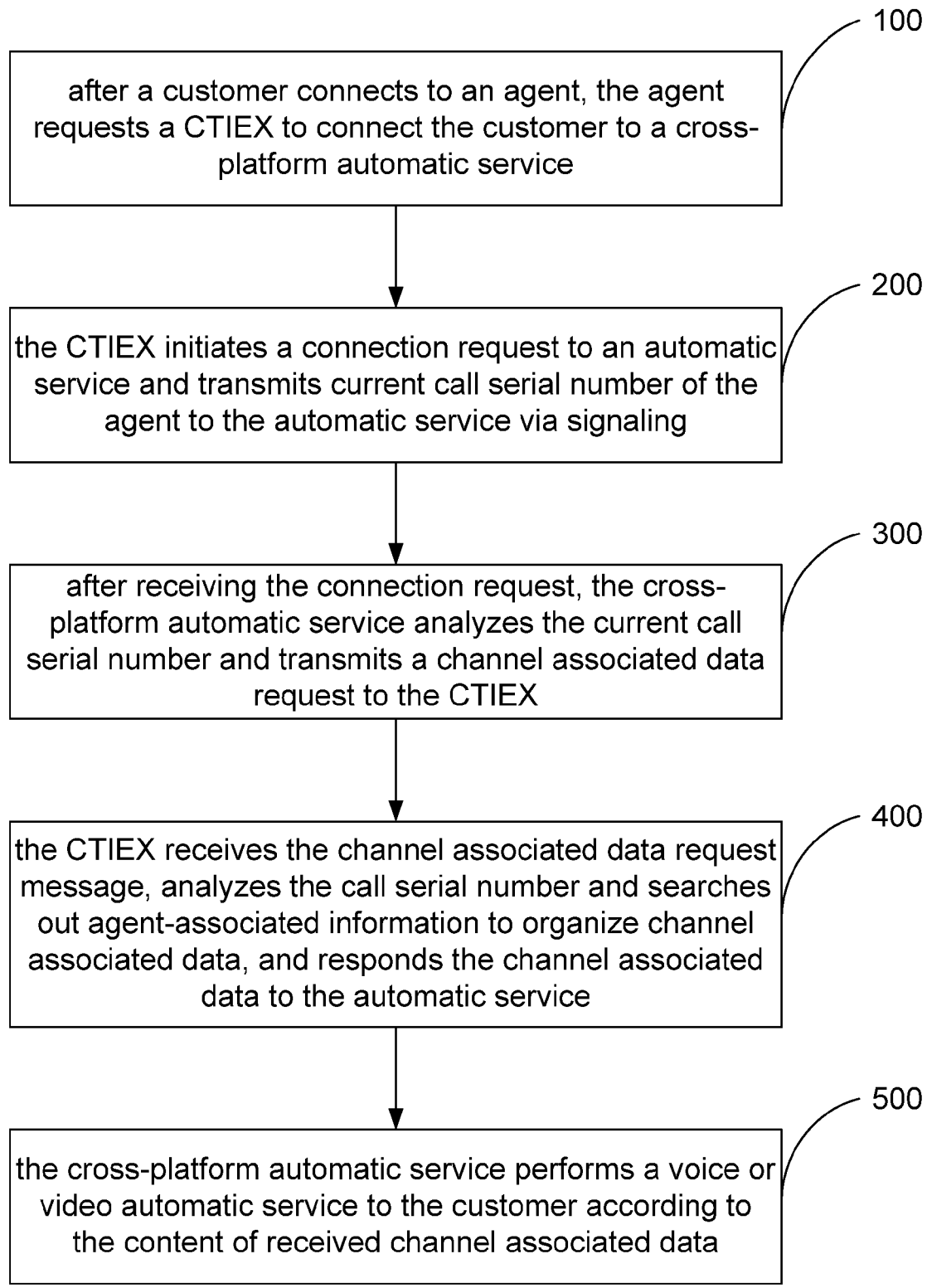
FIG. 3 is a flow chart illustrating a method for implementing channel associated data transmission between an agent and a cross-platform service according to the disclosure.

As shown in FIG. 3, a method for implementing channel associated data transmission between an agent and a cross-platform service according to the disclosure comprises the following steps:

step 100: after a customer connects to an agent, the agent requests CTIEX to connect a customer to a cross-platform automatic service;

step 200: the CTIEX initiates a connection request to an automatic service and forwards the customer to the cross-platform automatic service, and transmits current call serial number of the agent to the automatic service through signaling during forwarding;

step 300: after receiving the connection request from the CTIEX, the cross-platform automatic service analyzes the current call serial number of the agent and then transmits a channel associated data request to the CTIEX;

step 400: the CTIEX receives the channel associated data request message transmitted by the cross-platform automatic service, analyzes the call serial number contained in the channel associated data request message to search out agent-associated information and organize the channel associated data, and then responds the channel associated data to the automatic service; and step 500: the cross-platform automatic service performs a voice or video automatic service to a customer according to the content of received channel associated data.

Wherein in step 100, the process of performing the voice or video automatic service to the customer comprising connecting the customer to the automatic service according to the requirements of the customer so as to broadcast telephone number information required by the customer, broadcast the content of the customer's bill and perform password authentication to the customer through automatic speech.

Further, a call serial number corresponding to the agent should be contained in the connection request of the agent, and the channel associated data should be contained in the message of the connection request; the channel associated data comprises some information of the agent itself such as the employee number, the location and the address information of the agent; and some necessary information for the automatic service to perform service is also contained in the channel associated data, such as telephone number information for the automatic service to broadcast telephone number, and an account for the automatic service to broadcast the content of the customer's bill. The CTIEX will transmit the channel associated data to the cross-platform automatic service later.

In addition, after the automatic service completes the voice or video automatic service to the customer in step 500, the method may further comprise the following step:

step 600: the automatic service transmits contents such as service condition, service result and the like to the agent in form of channel associated data, for instance, the automatic service may inform the agent of the broadcasting times and whether the customer is satisfied with the result of broadcasting when the automatic service performs number broadcasting to the customer; and, when broadcasting bill information, the automatic service may also transmit summary of the bill to the agent so that the agent can make specific explanation to the customer; and, when performing password authentication to the customer, the automatic service may feed back to the customer whether the password authentication result is validated and whether the password level is advanced or common, etc.

The step 600 comprises the following steps:

1) the automatic service constructs a channel associated data message in which associate information such as the number of the agent and the like is contained, and then transmits the message to the cross-platform message module of the CTIEX through TCP;

2) the cross-platform message module of the CTIEX forwards the message to the processing module; the processing module analyzes the channel associated data message packet of the automatic service to reorganize channel associated data which can be recognized by the agent, and transmits the channel associated data to the agent through TCP; and after receiving the channel associated data, the agent can judge the condition of the cross-platform automatic service, which is used as a criterion for a subsequent step.

After automatically completing the automatic service, the automatic service forwards the customer back to communication with the agent, and the agent selectively performs a subsequent agent manual service according to the service condition transmitted by the channel associated data. For instance, after completing telephone number information broadcasting, the agent can ask whether the customer need another inquiry service and ask the customer to mark the service; after completing bill information broadcasting, the agent can make a further explanation to a customer's question according to the content of the bill in the channel associated data; and after completing the password authentication, the agent acquires whether the level of the customer is advanced or common, and can provide different contents of service.

The above-mentioned process will be further described below through a specific example.

Figure 4:
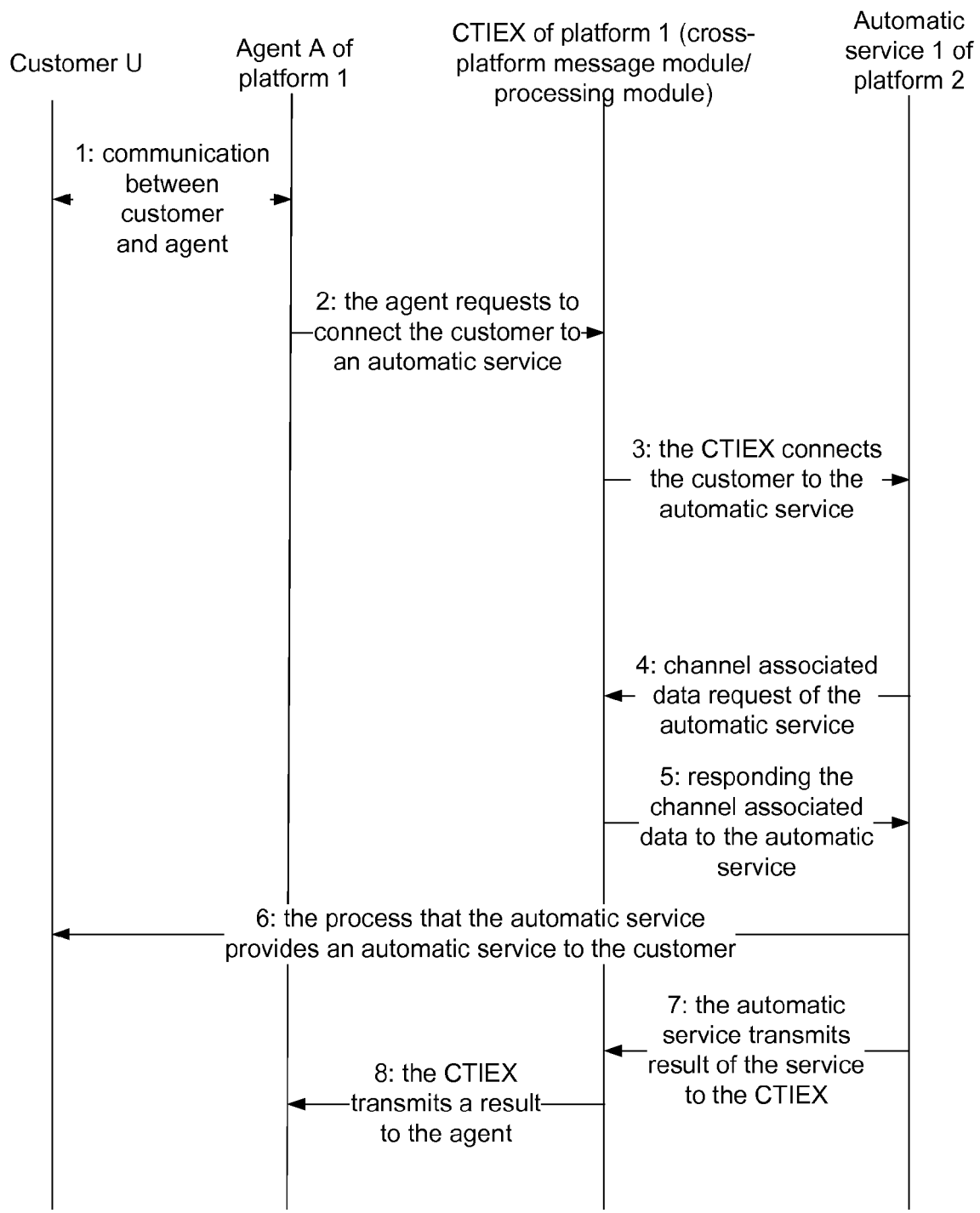
FIG. 4 is a flow chart illustrating a method for implementing channel associated data transmission between an agent and a cross-platform automatic service in a NGCC system according to an embodiment of the disclosure.

FIG. 4 is a flow chart illustrating a method for implementing channel associated data transmission between an agent and a cross-platform automatic service in a NGCC system according to an embodiment of the disclosure. A customer service system of telecom 118114 has two platforms, including platform 1 and platform 2, wherein for password collection to VIP customer, the manual agent of the platform 1 must be connected to automatic service 1 of the platform 2 to complete the collection. As shown in FIG. 3, the method for implementing channel associated data transmission during a password collection process performed by an agent through the cross-platform automatic service in a NGCC system according to an embodiment of the disclosure comprises the following steps:

step 1: a VIP customer call is connected to agent A of the platform 1, the customer communicates with the agent A;

step 2: when the agent A need to collect the password for the customer during communication, the agent A connects the customer to automatic service 1 of the platform 2 to perform password collection, wherein the connection process is that the agent connect the customer to the automatic service 1 of the platform 2 through CTIEX;

step 3: during connecting, the CTIEX transmits a current call serial number of the agent A to the automatic service through signaling, wherein the call serial number can be put into the calling number information of the signaling and separated from a real calling number by a symbol "**";

step 4: the automatic service receives the connection request, during password authentication, the automatic service 1 needs to acknowledge associate information such as an area where the customer locates, the VIP level of customer, password collection level, the password input prompt tone to be broadcast customized by the agent and the number of the agent; after analyzing the call serial number transmitted by the CTIEX, the automatic service constructs a channel associated data request packet, places the serial number into the message packet and transmits the message packet to the cross-platform message module of the CTIEX to acquire channel associated data, and analyzes information for the password authentication from the channel associated data;

step 5: the CTIEX analyzes the channel associated data request packet, searches out agent-associated information through the call serial number in the request packet, constructs a channel associated data result packet and puts the agent-associated information into the channel associated data result packet, and responds the result to the automatic service 1;

step 6: after receiving the result of the channel associated data, the automatic service 1 analyzes the channel associated data and performs password collection to the customer according to the information in the channel associated data;

step 7: after the password collection is completed, the automatic service 1 need to inform the agent of the result of the collection, constructs a channel associated data event message and puts information associated to the result of the collection into the channel associated data, puts information such as the number of the agent and the like into the channel associated data, and then transmits the message to the CTIEX;

step 8: the CTIEX analyzes the channel associated data message of the automatic service 1 to reorganize channel associated data which can be recognized by the agent and transmits the channel associated data to the agent; the agent acquires the result of the password collection according to the received channel associated data, and performs a subsequent operation flow according to the result of the password collection after the customer is forwarded back to communication with the agent.

In conclusion, by expanding an original call control unit CTI in the system into a CTIEX, for process of channel associated data transmission between a single-platform agent and an automatic service in existing NGCC system, the method and system for implementing channel associated data transmission between an agent and a cross-platform automatic service in the disclosure implements channel associated data transmission between an agent and a cross-platform automatic service in the NGCC system without adding an additional device, thus minimizing the cost.

Although the disclosure has been described in detail above in order to be understood by those of ordinary skill in the art, it should be appreciated that other variations and modifications can be devised without departing from the scope as defined by the claims appended, and that such variations and modifications are considered to be within the scope of the disclosure.

The invention claimed is:

1. A Cross-platform Message Module/Processing Module (CTIEX, Computer Telecommunication Integration Exchanger) for implementing channel associated data transmission between an agent and a cross-platform Interactive Voice Response (IVR) service, wherein during the IVR service, a customer is responded by automatic voice or video without human intervention, the CTIEX comprising a message module and a processing module, wherein the message module is configured to during a conversation between the customer and the agent, receive a request message sent from the agent for transferring the customer to the cross-platform IVR service through a core network and initiate a connection request massage to the cross-platform IVR service, wherein the connection request massage comprises the call serial number, and receive a channel associated data request message transmitted by the cross-platform IVR service, and transmit channel associated data organized by the processing module to the cross-platform IVR service; and the processing module is configured to analyze a current call serial number in the connection request message received by the message module, and analyze a call serial number in the channel associated data request message received by the message module to search out agent-associated information and organize channel associated data, wherein the cross-platform IVR service includes an IVR voice/video service, and the channel associated data includes a service result of the IVR service.

2. The CTIEX according to claim 1, wherein the processing module is configured to store, when analyzing the current call serial number in the connection request message received by the message module, the current call serial number and the channel associated data information in the current connection request transmitted by the agent.

3. The CTIEX according to claim 2, wherein the message module is configured to perform message receiving and message transmitting with the agent and the cross-platform IVR service through standard TCP.

4. The CTIEX according to claim 3, wherein the message module is configured to receive service condition and service result content responded by the cross-platform IVR service through channel associated data message packet after the cross-platform IVR service completes IVR service to the customer according to the content of the channel associated data, and transmit channel associated data which is reorganized by the processing module and can be recognized by the agent to the agent; and the processing module is configured to analyze the channel associated data message packet responded by the cross-platform IVR service to reorganize channel associated data which can be recognized by the agent.

5. The CTIEX according to claim 1, wherein the message module is configured to perform message receiving and message transmitting with the agent and the cross-platform IVR service through standard TCP.

6. The CTIEX according to claim 5, wherein the message module is configured to receive service condition and service result content responded by the cross-platform IVR service through channel associated data message packet after the cross-platform IVR service completes IVR service to the customer according to the content of the channel associated data, and transmit channel associated data which is reorganized by the processing module and can be recognized by the agent to the agent; and the processing module is configured to analyze the channel associated data message packet responded by the cross-platform IVR service to reorganize channel associated data which can be recognized by the agent.

7. A system for implementing channel associated data transmission between an agent and an IVR service, which comprises the CTIEX according to claim 1, and further comprising an agent and a cross-platform IVR service, wherein the agent is configured to transmit a request for connecting a customer to the cross-platform IVR service when the customer is needed to be connected to the cross-platform IVR service;

and the cross-platform IVR service is configured to analyze the current call serial number of the agent after receiving the connection request of the CTIEX, and then transmit a channel associated data request to the CTIEX; and perform a voice or video IVR service to the customer according to the content of the received channel associated data.

8. The system according to claim 7, wherein channel associated data request of the cross-platform IVR service comprises: address information of the CTIEX and call serial number of the agent.

9. A method for implementing channel associated data transmission between an agent and a cross-platform Interactive Voice Response (IVR) service, wherein during the IVR service, a customer is responded by automatic voice or video without human intervention, the method comprising the following steps:

step A1: during a conversation between the customer and the agent, requesting, by the agent, a CTIEX to transfer the customer to the cross-platform IVR service through a core network;

step A2: initiating, by the CTIEX, a connection request to the cross-platform IVR service to transmit current call serial number of the agent to the cross-platform IVR service;

step A3: analyzing, after the cross-platform automatic service receives the connection request of the CTIEX, the current call serial number of the agent, and then transmitting a channel associated data request to the CTIEX;

step A: receiving, by the CTIEX, a channel associated data request message transmitted by the cross-platform IVR service, analyzing call serial number in the channel associated data request message to search out agent-associated information, and organizing channel associated data, and then responding the channel associated data to the cross-platform IVR service; and step B: responding, by the cross-platform IVR service, to the customer's inquiry using automatic voice or video according to the content of the received channel associated data, wherein the channel associated data includes a service result of the cross-platform IVR service.

10. The method according to claim 9, wherein in the step B, after the cross-platform IVR service performers the voice or video IVR service to the customer, further comprising:

transmitting, by the cross-platform IVR service, service condition and service result content to the CTIEX through a channel associated data message packet; and analyzing, by the CTIEX, the channel associated data message packet of the cross-platform IVR service to reorganize channel associated data which can be recognized by the agent, and transmitting the channel associated data to the agent through TCP.

11. A system for implementing channel associated data transmission between an agent and an IVR service, which comprises the CTIEX according to claim 2, and further comprising an agent and a cross-platform IVR service, wherein the agent is configured to transmit a request for connecting a customer to the cross-platform IVR service when the customer is needed to be connected to the cross-platform IVR service;

and the cross-platform IVR service is configured to analyze the current call serial number of the agent after receiving the connection request of the CTIEX, and then transmit a channel associated data request to the CTIEX; and perform an IVR service to the customer according to the content of the received channel associated data.

12. The system according to claim 11, wherein channel associated data request of the cross-platform IVR service comprises:

address information of the CTIEX and call serial number of the agent.

* * * * *